United States Patent Office 3,234,292

Patented Feb. 8, 1966

3,234,292
PROCESS FOR CHLORINATING BENZOTRIFLUORIDE

Stephen Robota, North Tonawanda, and Edward A. Belmore, Niagara Falls, N.Y., assignors to Hooker Chemical Corporation, Niagara Falls, N.Y., a corporation of New York No Drawing. Filed July 16, 1962, Ser. No. 210,225
5 Claims. (Cl. 260—651)

This invention relates to the chlorination of benzotrifluoride to produce metachlorobenzotrifluoride; more specifically this invention relates to a process of chlorinating benzotrifluoride which results in a product which is unexpectedly rich in metachlorobenzotrifluoride.

Metachlorobenzotrifluoride has use as a chemical intermediate for the preparation of other useful chemicals and drugs, and for most such uses, a product which is high in metachlorobenzotrifluoride is desired for processing; the para and ortho isomers tend to give objectionable by-products when processed in such fashion. Metachlorobenzotrifluoride has been prepared by several methods: (1) for example, benzotrifluoride may be nitrated, then its nitro group reduced to an amino group which is in turn replaced by chlorine by the Sandmeyer reaction; (2) the simplest way is by chlorinating benzotrifluoride in the absence of light in the presence of a metal chloride catalyst such as ferric chloride. In such chlorinations, the trifluoromethyl group on the benzene ring is strongly meta directing, but minor amounts of the undesired para and ortho chlorobenzotrifluorides are formed. The orthochlorobenzotrifluoride is the least objectionable since its boiling point is some 14° C. higher than the desired metachlorobenzotrifluoride; the para isomer is very close to the meta isomer in boiling point, however, and is very difficult to separate by this method. Purification of the metachloro isomer by crystallization methods is also troublesome because of the low melting point of this compound (−56° C.).

Therefore, what is needed in the art is a simple and direct way of forming a product which is extremely rich in metachlorobenzotrifluoride formed by the chlorination of benzotrifluoride so that this product of high purity can be used as an intermediate as aforementioned. It is the applicants' discovery that the addition of small amounts of a source of sulfur will produce a product which is richer in metachlorobenzotrifluoride than is known in the prior art.

In the normal chlorination of benzotrifluoride to the metachloro derivative, an anhydrous ferric chloride catalyst is added to dry purified benzotrifluoride (alpha, alpha, alpha-trifluorotoluene), the mixture agitated and elemental chlorine passed in at a temperature of 65–75° C. until the specific gravity of the mixture reaches about 1.33 at 25° C./15.5° C. This end point is selected in order to obtain a substantial yield of the monochloro product while at the same time limiting the amount of unwanted higher chlorinated benzotrifluorides formed. Unreacted benzotrifluoride may be separated from the crude product by fractional distillation and recycled.

Under such conditions as described in the preceding paragraph, the metachlorobenzotrifluoride content of the crude product will be around 50%, that of the para about 6 or 7% and that of the ortho slightly lower. The ratio of meta to the parachloro isomer will run from about 8 to 9 and that of the meta to para+orthochloro isomer about 5. A product of usually not more than 85% metachlorobenzotrifluoride can be made from such crudes by fractional distillation.

An object of this invention is to provide an improvement in the monochlorination of benzotrifluoride to significantly increase the concentration of the meta derivative and to reduce the concentration of para and ortho derivatives. Another object of this invention is to provide a simple additive in the process of this invention whereby its beneficial effects are obtained. Still another object of this invention is to provide an inexpensive additive which can be put into the batch at the beginning of the chlorination and which is very easy to remove at the end.

Still other objects as well as the advantages of this invention will become readily apparent when the detailed specification which follows is considered:

The objects of this invention are accomplished by the addition of small amounts of a source of sulfur to the batch to be chlorinated at the beginning of the chlorination. By the term "source of sulfur," the applicants mean elemental sulfur, sulfur monochloride ($S_2Cl_2$), and sulfur dichloride ($SCl_2$); this term has this special meaning as used throughout the specification and claims. It has been found that when a source of sulfur is added as described, it will depress the parachloro isomer formation to 4 or 5% and the ortho isomer concentration to 2 to 3% in the final product. This correspondingly increases the meta to parachloroisomer ratio to 10 to 12 and the meta to para+ortho ratio to about 7. A product of about 90% or better of metachlorobenzotrifluoride may be fractionated from such a mixture.

The source of sulfur is considered with the metal chloride to form a total catalyst. The upper limit of the total catalyst which is added is not critical and is governed by economic and mechanical reasons rather than chemical ones. The lower limit is of course governed by its effectiveness in preferentially directing the chlorination of benzotrifluoride, but in practice it is preferred not to go below about 0.015 mole percent $S_2Cl_2$ or equivalent sulfur or $SCl_2$, when used under essentially dry conditions.

The ratio of metal chloride to source of sulfur is not critical in this invention, but it is preferred to use from one to two moles of metal chloride to one mole of $S_2Cl_2$ (or equivalent sulfur or $SCl_2$).

In order to illustrate the invention of this application, the following examples are given, and not to limit the invention thereby:

*Example 1*

945 grams (6.5 moles) of distilled and dried benzotrifluoride and 9.0 grams (0.055 mole) of anhydrous ferric chloride were added to a round-bottomed Pyrex flask equipped with a chlorine inlet tube, thermometer, agitator, reflux condenser, and water and alkali traps for collecting the by-product gases. The temperature was controlled at 65° C., and 465 grams of chlorine were added over a 16 hour period to produce 743 grams of a crude product having a specific gravity of 1.335 at 25° C./15.5° C. This material is neutralized and dried and found by gas chromatography analysis to have the following composition:

| Compound: | Weight percent |
|---|---|
| Benzotrifluoride | 24.7 |
| Meta-chlorobenzotrifluoride | 54.5 |
| Para-chlorobenzotrifluoride | 6.4 |
| Ortho-chlorobenzotrifluoride | 4.6 |
| Dichlorobenzotrifluorides | 9.1 |
| Trichlorobenzotrifluorides | 0.5 |
| Low boiling fraction | 0.1 |

The ratio here of meta-chlorobenzotrifluoride to parachlorobenzotrifluoride is 8.5 and that of the meta to ortho chloro+para chlorobenzotrifluorides is 5.

*Example 2*

946 grams of the same benzotrifluoride of Example 1 were added to a similar chlorinating flask along with 1.05 grams (0.0065 mole) of anhydrous ferric chloride and 0.44 gram (0.0033 mole) of $S_2Cl_2$. The temperature was again controlled at 65° C. and 697 grams of chlorine passed in during a period of 36 hours. At this time, the crude product had increased in weight to 1031 grams and had a specificc gravity of 1.329 at 25° C./15.5° C. After neutralizing and drying, this product showed the following composition by gas chromatography analysis:

| Compound: | Weight percent |
|---|---|
| Benzotrifluoride | 24.0 |
| Meta-chlorobenzotrifluoride | 55.0 |
| Para-chlorobenzotrifluoride | 4.6 |
| Ortho-chlorobenzotrifluoride | 2.9 |
| Dichlorobenzotrifluorides | 11.6 |
| Trichlorobenzotrifluorides | 1.9 |
| Low boiling fraction | – |

The ratio of meta to para-chlorobenzotrifluoride is 11.7 and the ratio of meta to ortho+para-chlorobenzotrifluoride is 7.35.

*Example 3*

944 grams (6.5 moles) of the same benzotrifluoride of Example 1 were charged into the same chlorinating equipment along with 4.2 grams (0.026 mole) of anhydrous ferric chloride and 1.7 grams (0.013 mole) of $S_2Cl_2$. The temperature was controlled at 65° C. and 490 grams of chlorine were passed in during a 27 hour period. At this time the specific gravity of the crude product was 1.329 at 25° C./15.5° C. The neutralized and dried product was shown to have the following composition by gas chromatography analysis:

| Compound: | Weight percent |
|---|---|
| Benzotrifluoride | 25.7 |
| Meta-chlorobenzotrifluoride | 54.0 |
| Para-chlorobenzotrifluoride | 4.7 |
| Ortho-chlorobenzotrifluoride | 2.9 |
| Dichlorobenzotrifluorides | 10.9 |
| Trichlorobenzotrifluorides | 1.8 |
| Low boiling fraction | 0.1 |

The ratio of meta-chlorobenzotrifluoride to para-chlorobenzotrifluoride is 11.5 and the ratio of meta-chlorobenzotrifluoride to para+ortho-chlorobenzotrifluoride is 7.2.

Example 1 was done without the use of a source of sulfur added, while Examples 2 and 3 were run with the additive. Therefore, by comparing these examples, it is readily apparent that a significcant increase in the richness of the meta isomer has been accomplished by the simple expedient of charging the additive into the reactor at the beginning of chlorination. No changes in chlorination techniques or equipment are necessary to practice this invention.

What is claimed is:

1. In the process of cholrinating benzotrifluoride to a mixture of monochlorbenzotrifluoride isomers by treating benzotrifluoride with chlorine gas in the absence of light and in the presence of a ferric chloride catalyst for the chlorination reaction, whereby metachlorobenzotrifluoride, parachlorobenzotrifluoride and orthochlorobenzotrifluoride are produced, the improvement which comprises conducting the catalytic reaction in the presence of a source of sulfur selected from the group consisting of sulfur, sulfur monochloride and sulfur dichloride, present in a catalytic proportion sufficient to diminish the production of parachlorobenzotrifluoride with respect to metachlorobenzotrifluoride.

2. In the process of chlorinating benzotrifluoride to a mixture of monochlorobenzotrifluoride isomers by treating benzotrifluoride with chlorine gas in the absence of light and in the presence of a ferric chloride catalyst for the chlorination reaction, whereby metachlorobenzotrifluoride, parachlorobenzotrifluoride and orthochlorobenzotrifluoride are produced, the improvement which comprises conducting the catalytic reaction in the presence of a sulfur chloride present in a catalytic proportion sufficient to diminish the production of parachlorobenzotrifluoride with respect to metachlorobenzotrifluoride.

3. In the process of chlorinating benzotrifluoride to a mixture of monochlorobenzotrifluoride isomers by treating benzotrifluoride with chlorine gas in the absence of light and in the presence of a ferric chloride catalyst for the chlorination reaction, whereby metachlorobenzotrifluoride, parachlorobenzotrifluoride and orthochlorobenzotrifluoride are produced, the improvement which comprises conducting the catalytic reaction in the presence of elemental sulfur present in a catalytic proportion sufficient to diminish the production of parachlorobenzotrifluoride with respect to metachlorobenzotrifluoride.

4. In the process of chlorinating benzotrifluoride to a mixture of monochlorobenzotrifluoride isomers by treating benzotrifluoride with chlorine gas in the absence of light and in the presence of a ferric chloride catalyst for the chlorination reaction, whereby metachlorobenzotrifluoride, parachlorobenzotrifluoride and orthochlorobenzotrifluoride are produced, the improvement which comprises adding sulfur monochloride to the benzotrifluoride starting material and conducting the chlorination of the benzotrifluoride in the presence of the sulfur monochloride, the sulfur monochloride being present in the benzotrifluoride reactant in a catalytic proportion sufficient to diminish the proportion of parachlorobenzotrifluoride with respect to the metachlorobenzotrifluoride made by the catalytic reaction.

5. In the process of chlorinating benzotrifluoride to a mixture of monochlorobenzotrifluoride isomers high in content of metachlorobenzotrifluoride and low in content of parachlorobenzotrifluoride, by reacting benzotrifluoride with chlorine in the absence of light and in the presence of a ferric chloride catalyst for the chlorination reaction, whereby metachlorobenzotrifluoride, orthochlorobenzotrifluoride and parachlorobenzotrifluoride and more highly chlorinated benzotrifluorides are produced, the improvement which comprises conducting the catalytic reaction in the presence of 0.015 to 0.2 mole percent of sulfur monochloride, based on the monochlorobenzotrifluoride, so that the chlorination product has a specific gravity of about 1.3 and has a ratio of metachlorobenzotrifluoride to parachlorobenzotrifluoride of more than 10:1, which product may be fractionally distilled to at least 90 percent of metachlorobenzotrifluoride.

References Cited by the Examiner

UNITED STATES PATENTS 2,174,513 10/1939 Holt et al. ---------- 260—651

FOREIGN PATENTS 259,329 10/1926 Great Britain.

OTHER REFERENCES

Kharasch et al., "J. Am. Chem. Soc.," vol. 61, pages 2142–50 (1939).

LEON ZITVER, *Primary Examiner.*

HAROLD G. MOORE, *Examiner.*